(12) United States Patent
Yang et al.

(10) Patent No.: US 12,552,612 B2
(45) Date of Patent: Feb. 17, 2026

(54) CONVEYING DEVICE AND PRODUCTION LINE

(71) Applicant: CONTEMPORARY AMPEREX TECHNOLOGY CO., LIMITED, Ningde (CN)

(72) Inventors: Xielin Yang, Ningde (CN); Feng Guan, Ningde (CN); Hongyan Liao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/293,947

(22) Filed: Aug. 7, 2025

(65) Prior Publication Data

US 2025/0361092 A1 Nov. 27, 2025

Related U.S. Application Data

(63) Continuation of application No. PCT/CN2024/113700, filed on Aug. 21, 2024.

(30) Foreign Application Priority Data

Jan. 18, 2024 (CN) .......................... 202420120380.1

(51) Int. Cl.
*B65G 23/44* (2006.01)
*B65G 23/04* (2006.01)

(52) U.S. Cl.
CPC ............. *B65G 23/44* (2013.01); *B65G 23/04* (2013.01); *B65G 2201/02* (2013.01)

(58) Field of Classification Search
None
See application file for complete search history.

(56) References Cited

U.S. PATENT DOCUMENTS 6,910,571 B1 * 6/2005 Ertel .................... B65G 21/105
492/38

FOREIGN PATENT DOCUMENTS

CN 105905532 A 8/2016
CN 216566531 U 5/2022
(Continued)

OTHER PUBLICATIONS

International Search Report in the international application No. PCT/CN2024/113700, mailed on Nov. 25, 2024, 8 pages with English translation.
(Continued)

*Primary Examiner* — Kavel Singh
(74) *Attorney, Agent, or Firm* — ANOVA LAW GROUP, PLLC (57) ABSTRACT

A conveying device includes a bracket, a conveyor belt, a first shaft, a second shaft, a support seat, and a bearing seat. The first shaft is threaded through an annular space of the conveyor belt, and the second shaft is threaded through the annular space of the conveyor belt. The first shaft and the second shaft are separately located at two ends of the conveyor belt along a conveying direction. The support seat is arranged on the bracket, one support seat is arranged at each of two shaft ends of the first shaft, and the shaft end of the first shaft is detachably connected to the support seat. The bearing seat is arranged on the bracket, one bearing seat is arranged at each of two shaft ends of the second shaft, and the shaft end of the second shaft is detachably connected to the bearing seat.

20 Claims, 6 Drawing Sheets

(56) References Cited

FOREIGN PATENT DOCUMENTS

| | | |
|---|---|---|
| CN | 217200418 U | 8/2022 |
| CN | 116409585 A | 7/2023 |
| CN | 117585424 A | 2/2024 |
| CN | 220683878 U | 3/2024 |
| DE | 102020112457 A1 | 11/2021 |

OTHER PUBLICATIONS

Written Opinion of the International Search Authority in the international application No. PCT/CN2024/113700, mailed on Nov. 25, 2024, 8 pages with English translation.

Notification of Examination Opinion on Request for Expedited Pre-Examination regarding Chinese Application No. 202420120380.1, issued on Jan. 15, 2024, 6 pages with English translation.

\* cited by examiner

CONVEYING DEVICE AND PRODUCTION LINE

CROSS-REFERENCE TO RELATED APPLICATIONS

The present application is a continuation of International Application No. PCT/CN2024/113700, filed on Aug. 21, 2024, which claims priority to Chinese Patent Application No. 202420120380.1 filed on Jan. 18, 2024 and entitled "CONVEYING DEVICE AND PRODUCTION LINE", which are incorporated herein by reference in their entirety.

TECHNICAL FIELD

The present disclosure relates to the technical field of batteries, and in particular, to a conveying device and a production line.

BACKGROUND

Batteries are increasingly applied in life and production. For example, new energy vehicles equipped with batteries have been widely used, and the batteries can be configured to fully or partially power the new energy vehicles. In addition, batteries are increasingly used in the fields of energy storage and the like.

During a battery production process, batteries or battery cells need to be conveyed from one workstation to another workstation by a conveying device. In the related art, batteries or battery cells are transported by a conveyor belt of the conveying device, and the conveyor belt needs maintenance and replacement.

SUMMARY

In view of this, embodiments of the present disclosure are intended to provide a conveying device that facilitate the disassembly of a conveyor belt, and a production line.

To achieve the objective, technical solutions in the embodiments of the present disclosure are implemented as follows:

Embodiments of the present disclosure provide a conveying device, including:
 a bracket;
 a conveyor belt;
 a first shaft, threaded through an annular space of the conveyor belt;
 a second shaft, threaded through the annular space of the conveyor belt, where the first shaft and the second shaft are separately located at two ends of the conveyor belt along a conveying direction;
 a support seat, arranged on the bracket, where one support seat is arranged at each of two shaft ends of the first shaft, and the shaft end of the first shaft is detachably connected to the support seat; and
 a bearing seat, arranged on the bracket, where one bearing seat is arranged at each of two shaft ends of the second shaft, and the shaft end of the second shaft is detachably connected to the bearing seat.

According to the conveying device provided by the embodiments of the present disclosure, when the conveyor belt needs maintenance or replacement, the first shaft can be disassembled from the support seat, the second shaft can be disassembled from the bearing seat, and then the conveyor belt can be pulled out from the first shaft and the second shaft to complete the disassembly of the conveyor belt. When the conveyor belt needs to be assembled to the bracket, the first shaft and the second shaft can be inserted into the annular space, and the first shaft can be mounted on the support seat and the second shaft can be mounted on the bearing seat to complete the mounting of the conveyor belt. In this way, there is no need to disassemble the support seat and the bearing seat from the bracket, and the conveyor belt may be conveniently disassembled by disassembling the first shaft and the second shaft, thereby reducing the difficulty of maintenance and replacement of the conveyor belt.

In some embodiments, the support seat includes two detachably connected seat bodies, the two seat bodies define a mounting hole, and the shaft end of the first shaft is accommodated in the mounting hole.

In these embodiments, a hole wall surface of the mounting hole can limit the shaft end of the first shaft from being separated from the support seat, thereby playing a role in detachably connecting the shaft end of the first shaft to the support seat. The two seat bodies are of split structure. When the first shaft needs to be disassembled, one seat body can be disassembled from the other seat body, and then the first shaft can be taken out, which is simple and convenient to operate.

In some embodiments, the two seat bodies are stacked in an up-down direction.

In these embodiments, during a disassembling process, an operator does not need to hold the first shaft to assist in disassembling the seat body, thereby reducing operation difficulty.

In some embodiments, an open groove is formed in the seat body, and the open grooves of the two seat bodies are oppositely spliced to form the mounting hole.

In these embodiments, the shaft end of the first shaft is located in the open grooves of the two seat bodies, and the two seat bodies jointly clamp the shaft end of the first shaft. When the first shaft needs to be disassembled, one seat body can be disassembled from the other seat body, and then the first shaft can be taken out from an opening of the open groove.

In some embodiments, a rotating bearing is arranged at the shaft end of the first shaft, a limiting protrusion is formed in the support seat, the limiting protrusion is arranged in the mounting hole, and the rotating bearing is accommodated in the mounting hole and abuts against the limiting protrusion.

In these embodiments, the limiting protrusion limits axial movement of the first shaft, thereby reducing axial displacement of the first shaft.

In some embodiments, a placement groove configured to accommodate the shaft end of the second shaft is formed in the bearing seat, and an entrance connected to the placement groove is formed on one side of the bearing seat along the conveying direction, and the shaft end of the second shaft enters and exits the placement groove through the entrance.

In these embodiments, a groove wall surface of the placement groove limits the shaft end of the second shaft from being separated from the placement groove, thereby playing a role in detachably connecting the shaft end of the second shaft to the bearing seat. When the second shaft needs to be disassembled, the shaft end of the second shaft can be taken out from the placement groove through the entrance. When the shaft end of the second shaft needs to be assembled to the bearing seat, the shaft end of the second shaft is then put into the placement groove through the entrance, which is simple and convenient to operate.

In some embodiments, the conveying device includes a tensioning mechanism arranged on the bracket, the tensioning mechanism is located on one side of the bearing seat where the entrance is formed, and the tensioning mechanism can abut against or release the second shaft.

In these embodiments, on the one hand, a force from the tensioning mechanism prevents the second shaft from escaping from the entrance, thereby playing a role in limiting movement of the second shaft. On the other hand, the tensioning mechanism causes the shaft end of the second shaft to abut against the groove wall surface of the placement groove, so that the second shaft can play a role in tensioning the conveyor belt. Exemplarily, when the conveyor belt needs to be disassembled, the second shaft can be released by the tensioning mechanism, so that the second shaft can escape from the placement groove through the entrance, and the conveyor belt is in a relaxed state, so as to facilitate the disassembly of the conveyor belt.

In some embodiments, the tensioning mechanism includes a fixing seat and an adjusting screw, the fixing seat is connected to the bracket, a threaded hole is formed in the fixing seat, the adjusting screw is in threaded cooperation with the threaded hole, and the adjusting screw abuts against or releases the second shaft.

In these embodiments, the adjusting screw may be rotated forward to move the adjusting screw away from the second shaft, thereby releasing the second shaft, so that the second shaft can escape from the entrance. The adjusting screw may be rotated backward, so that the adjusting screw is close to and abuts against the second shaft, and therefore, the second shaft cannot escape from the entrance. The tensioning mechanism is simple and easy to operate.

In some embodiments, the adjusting screw extends along the conveying direction, and the adjusting screw rotates relative to the fixing seat to be close to or away from the second shaft.

In these embodiments, the adjusting screw may be rotated forward to move the adjusting screw away from the second shaft, thereby releasing the second shaft, so that the second shaft can escape from the entrance. The adjusting screw may be rotated backward, so that the adjusting screw is close to and abuts against the second shaft, and therefore, the second shaft cannot escape from the entrance. The tensioning mechanism is simple and easy to operate.

In some embodiments, the second shaft includes a shaft core and a roller, the roller is rotatably sleeved outside the shaft core, and the adjusting screw abuts against a shaft end of the shaft core to limit the shaft core.

In these embodiments, during the rotation of the conveyor belt, the shaft core remains stationary to tension the conveyor belt, and the roller rotates around the shaft core to reduce friction between the conveyor belt and the roller.

In some embodiments, the conveying device includes a power source, and the power source drives the first shaft to rotate.

In these embodiments, the power source drives the first shaft to rotate. The first shaft rotates to drive the conveyor belt and the second shaft to rotate.

In some embodiments, the power source includes a motor.

In these embodiments, the motor drives the first shaft to rotate.

In some embodiments, a motor shaft of the motor and the first shaft are detachably connected through a coupling.

In these embodiments, the first shaft may be driven to rotate synchronously by the motor shaft. It can be understandable that when disassembling the first shaft, the coupling and the first shaft can be loosened, so that the first shaft can be disassembled from the support seat.

In some embodiments, the conveying device includes a protrusion and a groove, one of the protrusion and the groove is arranged on an inner surface of the conveyor belt, and the other of the protrusion and the groove is arranged on outer peripheral surfaces of both the first shaft and the second shaft, and the protrusion is slidably accommodated in the groove.

In these embodiments, during the rotation of the conveyor belt, the protrusion slides in the groove, and two groove wall surfaces along an axial direction of the groove can limit the protrusion from moving along the axial direction. Therefore, the conveyor belt cannot have any axial deviation, solving the problem that the conveyor belt deviates during the rotation.

In some embodiments, the conveying device includes a horizontally placed support plate, the support plate is threaded through an annular space of the conveyor belt, and the support plate is detachably connected to the bracket.

In these embodiments, the support plate plays a role in supporting the conveyor belt. The support plate is detachably connected to the bracket, so that when the conveyor belt needs to be disassembled, the support plate can be first disassembled and taken out from the annular space, and then the first shaft and the second shaft can be disassembled and the conveyor belt can be taken out from the first shaft and the second shaft, so as to avoid the support plate interfering with the rapid disassembly and assembly of the conveyor belt, thereby facilitating maintenance and replacement.

In some embodiments, there are a plurality of support plates, and the plurality of support plates are arranged at intervals along the conveying direction.

In these embodiments, the plurality of support plates can provide reliable support for the conveyor belt, and the size of the single support plate may be small to facilitate the support plate to be pulled out of the annular space, thereby reducing the difficulty of disassembly and assembly of the support plate.

In some embodiments, the conveying device includes a protrusion and a groove, one of the protrusion and the groove is arranged on an inner surface of the conveyor belt, and the other of the protrusion and the groove is arranged on an upper surface of the support plate, and the protrusion is slidably accommodated in the groove.

In these embodiments, during the rotation of the conveyor belt, the protrusion slides in the groove, and two groove wall surfaces along an axial direction of the groove can limit the protrusion from moving along the axial direction. Therefore, the conveyor belt cannot have any axial deviation, solving the problem that the conveyor belt deviates during the rotation.

In some embodiments, the conveying device includes a fastener, a portion of the support plate protrudes from the conveyor belt along an axial direction of the first shaft to form a connecting portion, and the fastener is detachably threaded through the connecting portion and the bracket in the up-down direction.

In these embodiments, a projection of the connecting portion on a horizontal plane is located on one side of a projection of the conveyor belt on the horizontal plane along the axial direction. When the support plate needs to be disassembled, the fastener can be disassembled from the up-down direction, which can avoid interference from other structures and facilitate operation.

In some embodiments, a mounting groove is formed in the connecting portion, the mounting groove penetrates through an outer periphery of the connecting portion, and the fastener is threaded through the mounting groove.

The embodiments of the present disclosure further provide a production line, configured to produce batteries, including a conveying device according to any one of the above.

DESCRIPTION OF REFERENCE NUMERALS

Bracket 1; conveyor belt 2; annular space 2a; first shaft 3; second shaft 4; support seat 5; mounting hole 5a; seat body 51; open groove 51a; limiting protrusion 511; bearing seat 6; placement groove 6a; tensioning mechanism 7; fixing seat 71; adjusting screw 72; support plate 8; connecting portion 81; mounting groove 81a; rotating bearing 9; power source 10; protrusion 100; groove 200.

DETAILED DESCRIPTION

Embodiments of the technical solutions of the present disclosure will be described in detail below in conjunction with the drawings. The following embodiments are only used to illustrate the technical solutions of the present disclosure more clearly, and are therefore used only as examples, and should not be used to limit the protection scope of the present disclosure.

Unless otherwise defined, all disclosure and scientific terms used herein have the same meaning as commonly understood by those skilled in the art belonging to the technical field of the present application. The terms used herein are intended only for the purpose of describing specific embodiments and are not intended to limit the present disclosure.

In the description of the embodiments of the present disclosure, the technical terms "first", "second", and the like are used only to distinguish different objects, and are not to be understood as indicating or implying a relative importance or implicitly specifying the number, particular order, or primary and secondary relation of the technical features indicated.

The reference to "embodiments" herein means that specific features, structures or characteristics described in combination with the embodiments may be included in at least one embodiment of the present disclosure. The appearance of this phrase in various places in the specification does not necessarily refer to the same embodiment, nor is it a separate or alternative embodiment that is mutually exclusive with other embodiments. It is explicitly or implicitly understood by persons skilled in the art that the embodiments described herein may be combined with other embodiments.

Figure 1:
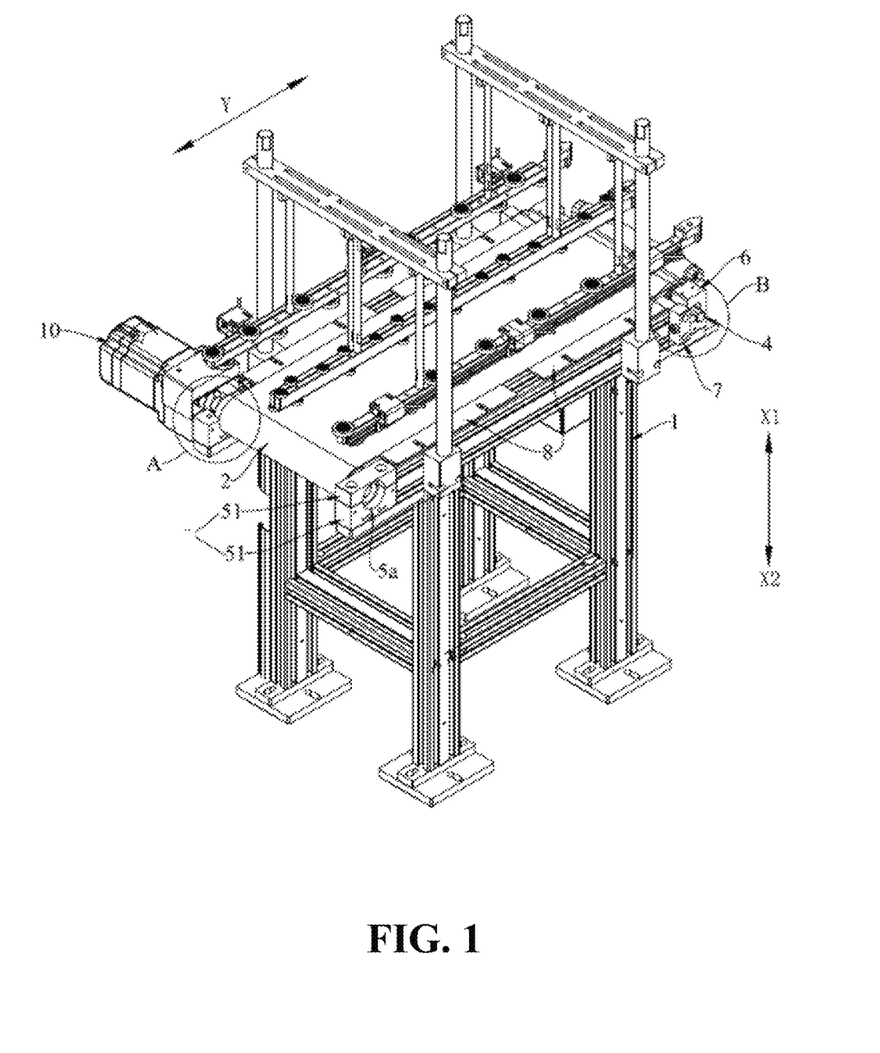
FIG. 1 is a schematic diagram of a structure of a conveying device according to an embodiment of the present disclosure.

It should be noted that in FIG. 1 of the present disclosure, the direction of an arrow X1 is upward, the direction of an arrow X2 is downward, and Y refers to a conveying direction.

In the following, the present disclosure will be described in detail.

Referring to FIG. 1 to FIG. 6, embodiments of the present disclosure provide a conveying device. The conveying device includes a bracket 1, a conveyor belt 2, a first shaft 3, a second shaft 4, a support seat 5, and a bearing seat 6.

Figure 4:
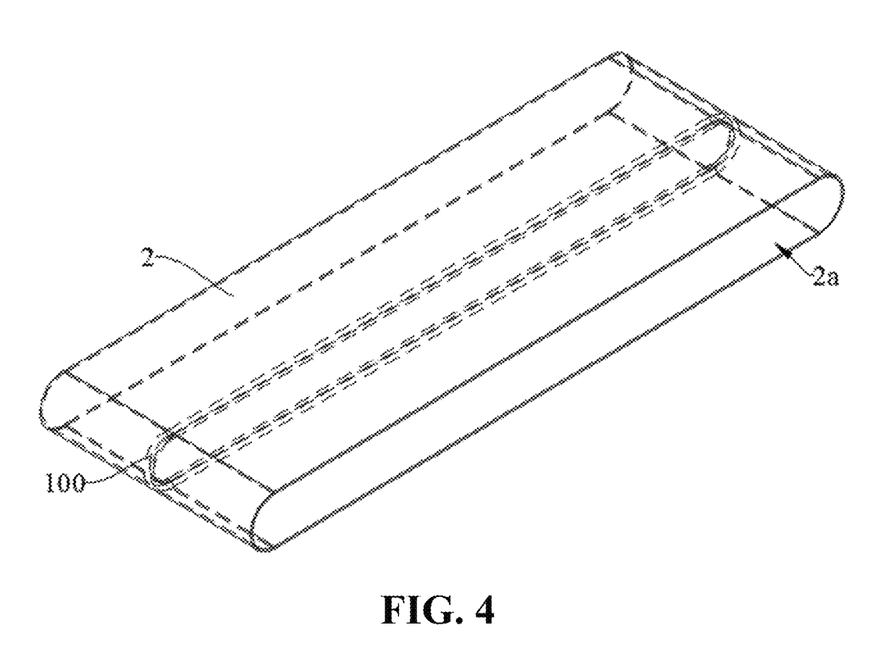
FIG. 4 is a schematic diagram of a structure of a conveyor belt according to an embodiment of the present disclosure.

Referring to FIG. 4, the conveyor belt 2 has an annular structure, and an internal space enclosed by the conveyor belt 2 is an annular space 2a.

The first shaft 3 is threaded through the annular space 2a of the conveyor belt 2. The second shaft 4 is threaded through the annular space 2a of the conveyor belt 2. The first shaft 3 and second shaft 4 are separately located at two ends of the conveyor belt 2 along the conveying direction. The first shaft 3 and the second shaft 4 drive the conveyor belt 2 to rotate, so that objects on the conveyor belt 2 moves from one station to another station along the conveying direction.

The support seat 5 is arranged on the bracket 1. One support seat 5 is arranged at each of two shaft ends of the first shaft 3. The shaft end of the first shaft 3 is detachably connected to the support seat 5. The bearing seat 6 is arranged on the bracket 1. One bearing seat 6 is arranged at each of two shaft ends of the second shaft 4. The shaft end of the second shaft 4 is detachably connected to the bearing seat 6.

According to the conveying device provided by the embodiments of the present disclosure, when the conveyor belt 2 needs maintenance or replacement, the first shaft 3 can be disassembled from the support seat 5, the second shaft 4 can be disassembled from the bearing seat 6, and then the conveyor belt 2 can be pulled out from the first shaft 3 and the second shaft 4 to complete the disassembly of the conveyor belt 2. When the conveyor belt 2 needs to be assembled to the bracket 1, the first shaft 3 and the second shaft 4 can be inserted into the annular space 2a, the first shaft 3 can be mounted on the support seat 5, and the second shaft 4 can be mounted on the bearing seat 6 to complete the mounting of the conveyor belt 2. In this way, there is no need to disassemble the support seat 5 and the bearing seat 6 from the bracket 1, and the conveyor belt 2 can be conveniently disassembled by disassembling the first shaft 3 and the second shaft 4, thereby reducing the difficulty of maintenance and replacement of the conveyor belt 2.

The shape of the annular space 2a defined by the conveyor belt 2 is not limited. Exemplarily, referring to FIG. 4, taking a plane perpendicular to a rotation axis of the first shaft 3 as a projection plane, a projection shape of the annular space 2a defined by the conveyor belt 2 is an oval shape.

Figure 2:
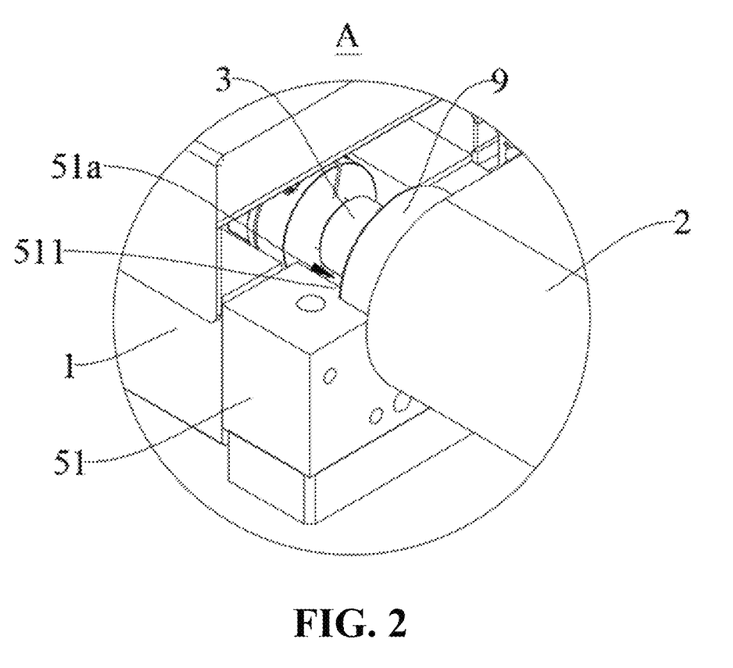
FIG. 2 is an enlarged schematic diagram at A in FIG. 1.

In one embodiment, referring to FIG. 1 and FIG. 2, the support seat 5 includes two detachably connected seat bodies 51. The two seat bodies 51 define a mounting hole 5a. The shaft end of first shaft 3 is accommodated in the mounting hole 5a. A hole wall surface of the mounting hole 5a can limit the shaft end of the first shaft 3 from being separated from the support seat 5, thereby playing a role in detachably connecting the shaft end of the first shaft 3 to the support seat 5. The two seat bodies 51 are of split structure. When the first shaft 3 needs to be disassembled, one seat body 51 can be disassembled from the other seat body 51, and then the first shaft 3 can be taken out, which is simple and convenient to operate.

Exemplarily, in one embodiment, referring to FIG. 1 and FIG. 2, an open groove 51a is formed in the seat body 51. The open grooves 51a of the two seat bodies 51 are oppositely spliced to form the mounting hole 5a. That is, the shaft end of the first shaft 3 is located in the open grooves 51a of the two seat bodies 51, and the two seat bodies 51 jointly clamp the shaft end of the first shaft 3. When the first shaft 3 needs to be disassembled, one seat body 51 can be disassembled from the other seat body 51, and the first shaft 3 can be taken out from an opening of the open groove 51*a*.

In one embodiment, referring to FIG. 1 and FIG. 2, the two seat bodies 51 are stacked in an up-down direction. Exemplarily, the opening of the open groove 51*a* of one seat body 51 faces upward, and the opening of the open groove 51*a* of the other seat body 51 faces downward. After the upper seat body 51 is disassembled, the shaft end of the first shaft 3 can be located in the open groove 51*a* of the lower seat body 51. In this way, during a disassembling process, an operator does not need to hold the first shaft 3 to assist in disassembling the seat body 51, thereby reducing operation difficulty.

Figure 3:
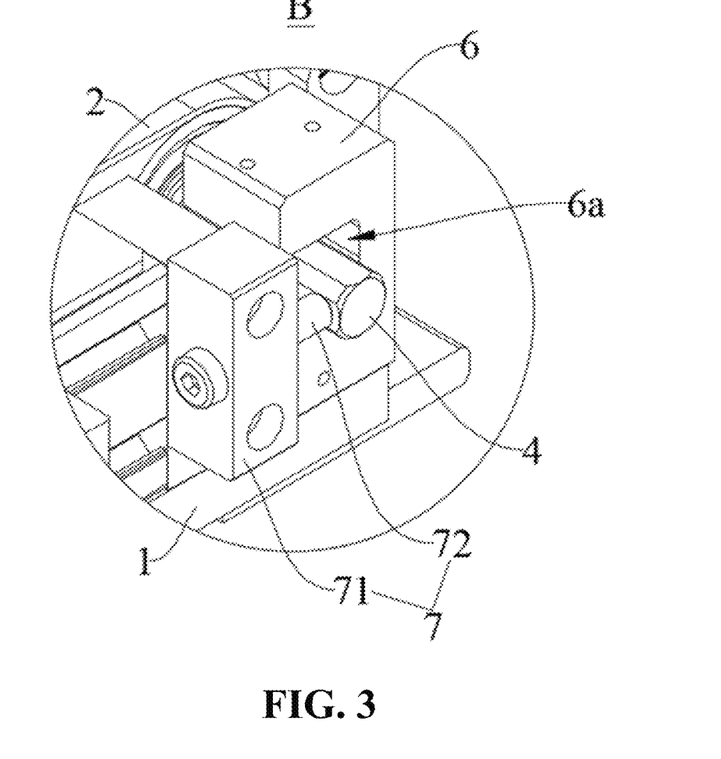
FIG. 3 is an enlarged schematic diagram at B in FIG. 1.

In one embodiment, referring to FIG. 1 and FIG. 3, a placement groove 6*a* configured to accommodate the shaft end of the second shaft 4 is formed in the bearing seat 6. An entrance connected to the placement groove 6*a* is formed on one side of the bearing seat 6 along the conveying direction. The shaft end of the second shaft 4 enters and exits the placement groove 6*a* through the entrance. A groove wall surface of the placement groove 6*a* limits the shaft end of the second shaft 4 from being separated from the placement groove 6*a*, thereby playing a role in detachably connecting the shaft end of the second shaft 4 to the bearing seat 6. When the second shaft 4 needs to be disassembled, the shaft end of the second shaft 4 can be taken out from the placement groove 6*a* through the entrance. When the shaft end of the second shaft 4 needs to be assembled to the bearing seat 6, the shaft end of the second shaft 4 is then put into the placement groove 6*a* through the entrance, which is simple and convenient to operate.

In one embodiment, referring to FIG. 1 and FIG. 3, the conveying device includes a tensioning mechanism 7 arranged on the bracket 1. The tensioning mechanism 7 is located on one side of the bearing seat 6 where the entrance is formed, and the tensioning mechanism 7 abuts against or releases the second shaft 4. That is, the tensioning mechanism 7 is located on one side of the bearing seat 6 close to the entrance along the conveying direction. The tensioning mechanism 7 abuts against the second shaft 4 to apply a force away from the entrance to the second shaft 4, thereby locking the second shaft 4. The tensioning mechanism 7 moves away from the second shaft 4 to release the second shaft 4. On the one hand, the force from the tensioning mechanism 7 prevents the second shaft 4 from escaping from the entrance, thereby playing a role in limiting movement of the second shaft 4. On the other hand, the tensioning mechanism 7 causes the shaft end of the second shaft 4 to abut against the groove wall surface of the placement groove 6, so that the second shaft 4 can play a role in tensioning the conveyor belt 2. Exemplarily, when the conveyor belt 2 needs to be disassembled, the second shaft 4 can be released by the tensioning mechanism 7, so that the second shaft 4 can escape from the placement groove 6*a* through the entrance, and the conveyor belt 2 is in a loosened state, so as to facilitate the disassembly of the conveyor belt 2.

In one embodiment, referring to FIG. 3, the tensioning mechanism 7 includes a fixing seat 71 and an adjusting screw 72. The fixing seat 71 is connected to bracket 1. A threaded hole is formed in the fixing seat 71. The adjusting screw 72 is in threaded cooperation with the hole. The adjusting screw 72 abuts against or releases the second shaft 4. Specifically, the adjusting screw 72 extends along the conveying direction, and the adjusting screw 72 rotates relative to the fixing seat 71 to be close to or away from the second shaft 4. The adjusting screw 72 can be rotated forward to move the adjusting screw 72 away from the second shaft 4, thereby releasing the second shaft 4, so that the second shaft 4 can escape from the entrance. The adjusting screw 72 can be rotated backward, so that the adjusting screw 72 is close to and abuts against the second shaft 4, and therefore, the second shaft 4 cannot escape from the entrance. The tensioning mechanism 7 is simple and easy to operate.

In some embodiments, there may be two tensioning mechanisms 7, and the two tensioning mechanisms 7 may separately abut against or release two shaft ends of the second shaft 4.

In one embodiment, the second shaft 4 includes a shaft core and a roller. The roller is rotatably sleeved outside the shaft core. The adjusting screw 72 may abut against a shaft end of the shaft core to limit the shaft core. The roller may rotate around the shaft core. In this way, during the rotation of the conveyor belt 2, the shaft core remains stationary to tension the conveyor belt 2, and the roller rotates around the shaft core to reduce friction between the conveyor belt 2 and the roller.

In one embodiment, referring to FIG. 1 and FIG. 2, a rotating bearing 9 is arranged at the shaft end of the first shaft 3. A limiting protrusion 511 is formed on the support seat 5. The limiting protrusion 511 is arranged in the mounting hole 5*a*. The rotating bearing 9 is accommodated in the mounting hole 5*a* and abuts against the limiting protrusion 511. The limiting protrusion 511 limits axial movement of the first shaft 3, thereby reducing axial displacement of the first shaft 3.

In one embodiment, referring to FIG. 1 to FIG. 3, the conveying device includes a power source 10. The power source 10 drives the first shaft 3 to rotate. The first shaft 3 rotates to drive the conveyor belt 2 and the second shaft 4 to rotate.

The power source 10 includes, but is not limited to, a motor. Exemplarily, a motor shaft of the motor and the first shaft 3 may be detachably connected through a coupling. In this way, the first shaft 3 may be driven to rotate synchronously by the motor shaft. It can be understandable that when disassembling the first shaft 3, the coupling and the first shaft 3 can be loosened, so that the first shaft 3 can be disassembled from the support seat 5.

Figure 6:
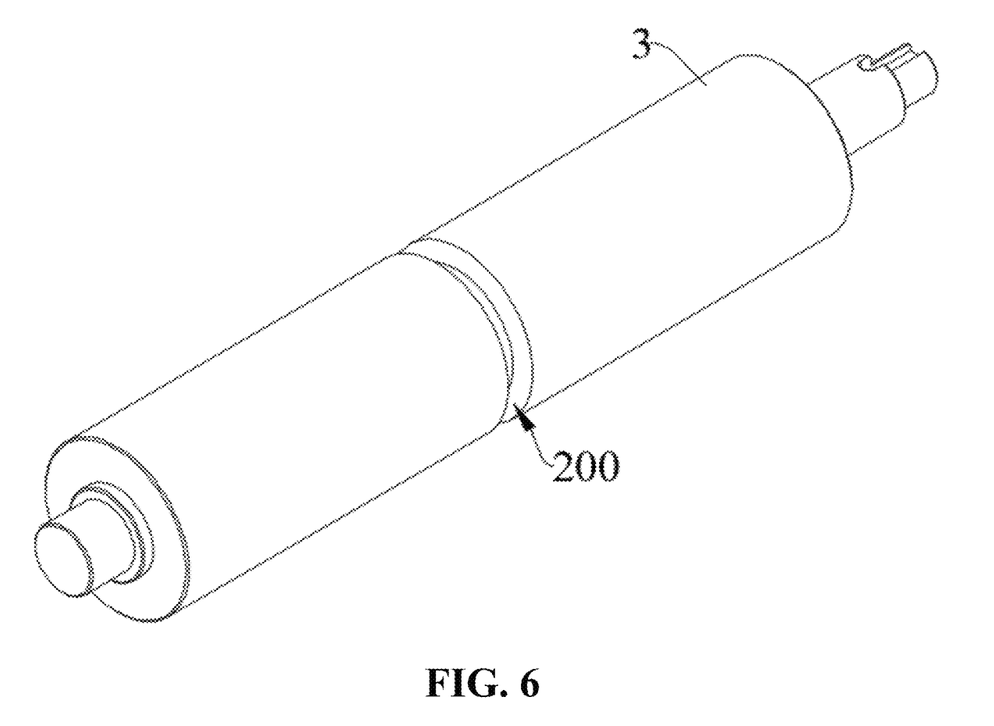
FIG. 6 is a schematic diagram of a structure of a first shaft according to an embodiment of the present disclosure.

In one embodiment, referring to FIG. 4 and FIG. 6, the conveying device includes a protrusion 100 and a groove 200. One of the protrusion 100 and the groove 200 is arranged on an inner surface of the conveyor belt 2, and the other of the protrusion 100 and the groove 200 is arranged on outer peripheral surfaces of both the first shaft 3 and the second shaft 4. The protrusion 100 is slidably accommodated in the groove 200. Exemplarily, in one embodiment, referring to FIG. 4 and FIG. 6, the protrusion 100 is arranged on the inner surface of the conveyor belt 2. The groove 200 is arranged on the outer peripheral surfaces of both the first shaft 3 and the second shaft 4. The protrusion 100 may surround the inner surface of the conveyor belt 2. The groove 200 of the first shaft 3 may surround the outer peripheral surface of the first shaft 3. The groove 200 of the second shaft 4 may surround the outer peripheral surface of the second shaft 4. In another embodiment, the groove 200 is arranged on the inner surface of the conveyor belt 2. The protrusion 100 is arranged on the outer peripheral surfaces of both the first shaft 3 and the second shaft 4. The groove 200 may surround the inner surface of the conveyor belt 2. The protrusion 100 of the first shaft 3 may surround the outer peripheral surface of the first shaft 3. The protrusion 100 of the second shaft 4 may surround the outer peripheral surface of the second shaft 4. During the rotation of the conveyor belt 2, the protrusion 100 slides in the groove 200, and two groove wall surfaces of the groove 200 along an axial direction can limit the protrusion 100 from moving along the axial direction. Therefore, the conveyor belt 2 cannot have any axial deviation, solving the problem that the conveyor belt 2 deviates during the rotation.

Figure 5:
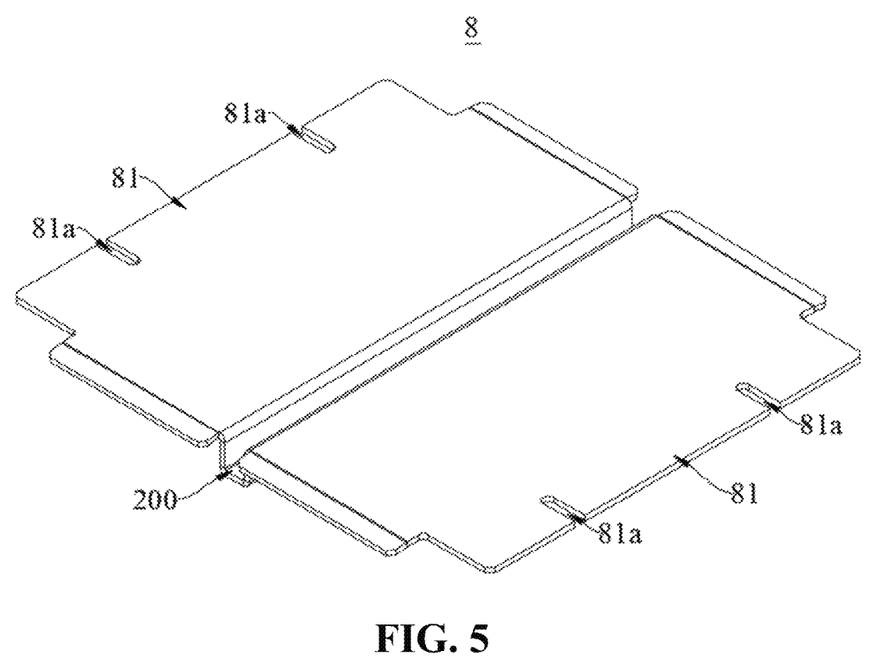
FIG. 5 is a schematic diagram of a structure of a support plate according to an embodiment of the present disclosure.

In one embodiment, referring to FIG. 1, FIG. 4, and FIG. 5, the conveying device includes a horizontally placed support plate 8. The support plate 8 is threaded through the annular space 2a of the conveyor belt 2. The support plate 8 is detachably connected to the bracket 1. The support plate 8 plays a role in supporting the conveyor belt 2. The support plate 8 is detachably connected to the bracket 1, so that when the conveyor belt 2 needs to be disassembled, the support plate 8 can be first disassembled and taken out from the annular space 2a, and then the first shaft 3 and the second shaft 4 can be disassembled and the conveyor belt 2 can be taken out from the first shaft 3 and the second shaft 4, so as to avoid the support plate 8 interfering with the rapid disassembly and assembly of the conveyor belt 2, thereby facilitating maintenance and replacement.

In one embodiment, referring to FIG. 1, FIG. 4, and FIG. 5, there are a plurality of support plates 8, and the plurality of support plates 8 are arranged at intervals along the conveying direction. With such design, the plurality of support plates 8 can provide reliable support for the conveyor belt 2, and the size of the single support plate 8 may be small to facilitate the support plate 8 to be pulled out of the annular space 2a, thereby reducing the difficulty of disassembly and assembly of the support plate 8.

In one embodiment, referring to FIG. 1, FIG. 4, and FIG. 5, the conveying device includes a protrusion 100 and a groove 200. One of the protrusion 100 and the groove 200 is arranged on an inner surface of the conveyor belt 2, and the other of the protrusion 100 and the groove 200 is arranged on an upper surface of the support plate 8. The protrusion 100 is slidably accommodated in the groove 200. Exemplarily, in one embodiment, referring to FIG. 1, FIG. 4, and FIG. 5, the protrusion 100 is arranged on the inner surface of the conveyor belt 2. The groove 200 is arranged on the upper surface of the support plate 8. The protrusion 100 may surround the inner surface of the conveyor belt 2. The groove 200 may penetrate through two ends of the support plate 8 along the conveying direction. In another embodiment, the groove 200 is arranged on the inner surface of the conveyor belt 2. The protrusion 100 is arranged on the upper surface of the support plate 8. The groove 200 may surround the inner surface of the conveyor belt 2. The protrusion 100 may extend to two ends of the support plate 8 along the conveying direction. During the rotation of the conveyor belt 2, the protrusion 100 slides in the groove 200, and two groove wall surfaces of the groove 200 along an axial direction can limit the protrusion 100 from moving along the axial direction. Therefore, the conveyor belt 2 cannot have any axial deviation, solving the problem that the conveyor belt 2 deviates during the rotation.

It can be understood that, in some embodiments, the groove 200 is arranged on the conveyor belt 2, and the protrusion 100 is arranged on each of the first shaft 3, the second shaft 4, and the support plate 8. In some other embodiments, referring to FIG. 1, FIG. 4, FIG. 5, and FIG. 6, the protrusion 100 is arranged on the conveyor belt 2, and the groove 200 is arranged on each of the first shaft 3, the second shaft 4, and the support plate 8.

In one embodiment, referring to FIG. 1 and FIG. 5, the conveying device includes a fastener. A portion of the support plate 8 protrudes from the conveyor belt 2 along an axial direction of the first shaft 3 to form a connecting portion 81. The fastener is detachably threaded through the connecting portion 81 and the bracket 1 in the up-down direction. That is, a projection of the connecting portion 81 on a horizontal plane is located on one side of a projection of the conveyor belt 2 on the horizontal plane along the axial direction. When the support plate 8 needs to be disassembled, the fastener may be disassembled from the up-down direction, which can avoid interference with other structures and facilitate operation.

The type of the fastener includes but is not limited to a screw or a bolt, etc.

Exemplarily, in one embodiment, referring to FIG. 5, a mounting groove 81a is formed in the connecting portion 81. The mounting groove 81a penetrates through an outer periphery of the connecting portion 81. The fastener is threaded through the mounting groove 81a.

Embodiments of the present disclosure further provide a production line, configured to produce batteries. The production line includes a conveying device according to any embodiment of the present disclosure.

The conveyor belt 2 may be configured to place batteries or battery cells. The first shaft 3 and the second shaft 4 drive the conveyor belt 2 to rotate, so that the batteries or battery cells on the conveyor belt 2 move from one station to another station along the conveying direction.

Both the conveying device and the production line provided by the embodiments of the present disclosure can be used for the production of the battery of the present disclosure.

The battery provided by the embodiments of the present disclosure may be used alone. The plurality of batteries may further be grouped together and used as a battery pack. The battery and the battery pack may be used in, but not limited to, an electrical apparatus. The electrical apparatus may be, but is not limited to, a mobile phone, a tablet, a laptop, an electric toy, an electric tool, a vehicle, a ship, or a spacecraft, etc. The spacecraft may include an aircraft, a rocket, a space shuttle, or a spaceship, etc.

Taking the electrical apparatus according to one embodiment of the present disclosure as an example, the vehicle may be a fuel vehicle, a gas vehicle, or a new energy vehicle. The new energy vehicle may be a pure electric vehicle, a hybrid vehicle, or an extended-range vehicle, etc. A battery is provided inside the vehicle and may be arranged at the bottom or front or tail of the vehicle. The battery may be used to power the vehicle. For example, the battery may be used as an operating power source of the vehicle. In some embodiments, the battery may not only be used as the operating power source of the vehicle, but also as a driving power source of the vehicle, replacing or partially replacing fuel or natural gas to provide driving power for the vehicle.

The battery may be a lithium-ion battery, a sodium-lithium-ion battery, a lithium metal battery, or a lithium-sulfur battery, etc., which is not limited in the embodiments of the present disclosure.

The battery includes at least one battery cell. The battery cell is an energy storage component of the battery. The battery further includes a battery monitoring and management apparatus, configured to monitor a power level of the battery cell.

In the battery, there may be a plurality of battery cells, and the plurality of battery cells may be connected in series or in parallel or in hybrid connection. The hybrid connection means that some of the plurality of battery cells are connected in series and some are connected in parallel. The plurality of battery cells may be directly connected in series or in parallel or in hybrid connection. Certainly, the battery may alternatively be a battery module formed by connecting the plurality of battery cells in series or in parallel or in hybrid connection, and then connecting the plurality of battery modules in series or in parallel or in hybrid connection to form a whole.

In the embodiments of the present disclosure, the battery cell may be a secondary battery cell. The secondary battery cell refers to a battery cell that can be charged to activate an active material and continue to be used after the battery cell is discharged.

The battery cell may be a cylindrical battery cell, a prismatic battery cell or a battery cell of other shapes. The prismatic battery cell includes a square-shell battery cell or a polygonal prismatic battery cell. The polygonal prismatic battery cell is, for example, a hexagonal prismatic battery cell, etc., which is not particularly limited in the present disclosure.

Exemplarily, the battery cell includes a shell, an electrode assembly, and an electrolyte solution. The electrode assembly and the electrolyte solution are placed in the shell. The shell is configured to encapsulate components, such as the electrode assembly and electrolyte solution.

The above embodiments are merely intended for illustrating rather than limiting the technical solutions of the present disclosure. Although the present disclosure has been described in detail with reference to the various embodiments above, those of ordinary skill in the art should understand that the technical solutions specified in the various embodiments above may still be modified, or some or all of the technical features therein may be equivalently substituted; and such modifications or substitutions do not cause the essence of the corresponding technical solutions to depart from the scope of the technical solutions of the various embodiments of the present disclosure. In particular, as long as there is no structural conflict, the various technical features mentioned in the embodiments can be combined in any way.

What is claimed is:

1. A conveying device, comprising:
    a bracket;
    a conveyor belt;
    a first shaft, threaded through an annular space of the conveyor belt;
    a second shaft, threaded through the annular space of the conveyor belt, wherein the first shaft and the second shaft are separately located at two ends of the conveyor belt along a conveying direction;
    a support seat, arranged on the bracket, wherein one support seat is arranged at each of two shaft ends of the first shaft and includes two detachably connected seat bodies arranged to form a mounting hole between the two seat bodies and opening in a direction parallel to an axial direction of the first shaft, and the shaft end of the first shaft is detachably connected to the support seat and accommodated in the mounting hole; and
    a bearing seat, arranged on the bracket, wherein one bearing seat is arranged at each of two shaft ends of the second shaft, and the shaft end of the second shaft is detachably connected to the bearing seat.

2. The conveying device according to claim 1, wherein the two seat bodies are stacked in an up-down direction.

3. The conveying device according to claim 1, wherein an open groove is formed in the seat body, and the open grooves of the two seat bodies are oppositely spliced to form the mounting hole.

4. The conveying device according to claim 1, wherein a rotating bearing is arranged at the shaft end of the first shaft, a limiting protrusion is formed on the support seat, the limiting protrusion is arranged in the mounting hole, and the rotating bearing is accommodated in the mounting hole and abuts against the limiting protrusion.

5. The conveying device according to claim 1, wherein a placement groove configured to accommodate the shaft end of the second shaft is formed in the bearing seat, and an entrance connected to the placement groove is formed on one side of the bearing seat and opens in the conveying direction, and the shaft end of the second shaft enters and exits the placement groove through the entrance.

6. The conveying device according to claim 5, wherein the conveying device comprises a tensioning mechanism arranged on the bracket, the tensioning mechanism is located on one side of the bearing seat where the entrance is formed, and the tensioning mechanism is capable of abutting against or releasing the second shaft.

7. The conveying device according to claim 6, wherein the tensioning mechanism comprises a fixing seat and an adjusting screw, the fixing seat is connected to the bracket, a threaded hole is formed in the fixing seat, the adjusting screw is in threaded cooperation with the threaded hole, and the adjusting screw abuts against or releases the second shaft.

8. The conveying device according to claim 7, wherein the adjusting screw extends along the conveying direction, and the adjusting screw rotates relative to the fixing seat to be close to or away from the second shaft.

9. The conveying device according to claim 7, wherein the second shaft comprises a shaft core and a roller, the roller is rotatably sleeved outside the shaft core, and the adjusting screw abuts against a shaft end of the shaft core to limit the shaft core.

10. The conveying device according to claim 1, wherein the conveying device comprises a power source, and the power source drives the first shaft to rotate.

11. The conveying device according to claim 10, wherein the power source comprises a motor.

12. The conveying device according to claim 11, wherein a motor shaft of the motor and the first shaft are detachably connected through a coupling.

13. The conveying device according to claim 1, wherein the conveying device comprises a protrusion and a groove, one of the protrusion and the groove is arranged on an inner surface of the conveyor belt, and the other of the protrusion and the groove is arranged on outer peripheral surfaces of both the first shaft and the second shaft, and the protrusion is slidably accommodated in the groove.

14. The conveying device according to claim 1, wherein the conveying device comprises a horizontally placed support plate, the support plate is threaded through an annular space of the conveyor belt, and the support plate is detachably connected to the bracket.

15. The conveying device according to claim 14, wherein:
    there are a plurality of support plates, and the plurality of support plates are arranged at intervals along the conveying direction; or
    the conveying device comprises a protrusion and a groove, one of the protrusion and the groove is arranged on an inner surface of the conveyor belt, and the other of the protrusion and the groove is arranged on an upper surface of the support plate, and the protrusion is slidably accommodated in the groove.

16. The conveying device according to claim 14, wherein the conveying device comprises a fastener, a portion of the support plate protrudes from the conveyor belt along an axial direction of the first shaft to form a connecting portion, and the fastener is detachably threaded through the connecting portion and the bracket in the up-down direction.

17. The conveying device according to claim 16, wherein a mounting groove is formed in the connecting portion, the mounting groove is threaded through an outer periphery of the connecting portion, and the fastener is threaded through the mounting groove.

18. A production line, configured to produce batteries, comprising the conveying device according to claim 1.

19. A conveying device, comprising:
a bracket;
a conveyor belt;
a first shaft, threaded through an annular space of the conveyor belt;
a second shaft, threaded through the annular space of the conveyor belt, wherein the first shaft and the second shaft are separately located at two ends of the conveyor belt along a conveying direction;
a support seat, arranged on the bracket, wherein one support seat is arranged at each of two shaft ends of the first shaft, and the shaft end of the first shaft is detachably connected to the support seat; and
a bearing seat, arranged on the bracket, wherein one bearing seat is arranged at each of two shaft ends of the second shaft, and the shaft end of the second shaft is detachably connected to the bearing seat;
wherein the support seat comprises two detachably connected seat bodies, the two seat bodies define a mounting hole, a limiting protrusion is formed on the support seat and arranged in the mounting hole, and a rotating bearing arranged at the shaft end of the first shaft is accommodated in the mounting hole and abuts against the limiting protrusion.

20. A conveying device, comprising:
a bracket;
a conveyor belt;
a first shaft, threaded through an annular space of the conveyor belt;
a second shaft, threaded through the annular space of the conveyor belt, wherein the first shaft and the second shaft are separately located at two ends of the conveyor belt along a conveying direction;
a support seat, arranged on the bracket, wherein one support seat is arranged at each of two shaft ends of the first shaft, and the shaft end of the first shaft is detachably connected to the support seat;
a bearing seat, arranged on the bracket, wherein one bearing seat is arranged at each of two shaft ends of the second shaft, and the shaft end of the second shaft is detachably connected to the bearing seat; and
a tensioning mechanism arranged on the bracket;
wherein:
a placement groove configured to accommodate the shaft end of the second shaft is formed in the bearing seat, and an entrance connected to the placement groove is formed on one side of the bearing seat along the conveying direction, and the shaft end of the second shaft enters and exits the placement groove through the entrance;
the tensioning mechanism is located on one side of the bearing seat where the entrance is formed, and the tensioning mechanism is capable of abutting against or releasing the second shaft; and
the tensioning mechanism comprises a fixing seat and an adjusting screw, the fixing seat is connected to the bracket, a threaded hole is formed in the fixing seat, the adjusting screw is in threaded cooperation with the threaded hole, and the adjusting screw abuts against or releases the second shaft.

* * * * *